United States Patent [19]

Bianchi

[11] 3,884,107

[45] May 20, 1975

[54] PRESS PROVIDED WITH A PRESS-PLATE WITH THREE DEGREES OF FREEDOM

[76] Inventor: Vittorio Luigi Achille Bianchi, 37, Ave. Paul Doumer, 75016 Paris, France

[22] Filed: Mar. 21, 1973

[21] Appl. No.: 343,247

[30] Foreign Application Priority Data
June 30, 1972 France .................... 72.23815

[52] U.S. Cl. .................................. 83/534; 83/563
[51] Int. Cl. .................................... B26d 5/12
[58] Field of Search ................ 83/531, 534, 563

[56] References Cited
UNITED STATES PATENTS

| | | | |
|---|---|---|---|
| 3,190,166 | 6/1965 | Haas ...................... | 83/534 |
| 3,204,506 | 9/1965 | Reinhold ................. | 83/534 |
| 3,389,628 | 6/1968 | Banks et al. ............. | 83/534 X |
| 3,575,077 | 4/1971 | Herdeg et al. ........... | 83/534 X |
| 3,779,112 | 12/1973 | Vallier ..................... | 83/534 X |

FOREIGN PATENTS OR APPLICATIONS

| 1,229,594 | 4/1971 | United Kingdom .................. | 83/534 |

*Primary Examiner*—Willie G. Abercrombie
*Attorney, Agent, or Firm*—Steinberg & Blake

[57] ABSTRACT

Press for cutting a material in the form of a sheet comprising a horizontal work-table, a moving bridge located above the worktable over the whole length of the latter and capable of sliding horizontally so as to either overhang the said table or free it by being moved aside therefrom, a press-plate supported by a carriage mounted under the said bridge and movable in horizontal translation in a direction perpendicular to the direction of displacement of the bridge itself, the said plate being moreover movable in vertical translation so as to apply a vertical pressure on the cutting tool placed on the material to be cut and cause it to penetrate into said material.

7 Claims, 3 Drawing Figures

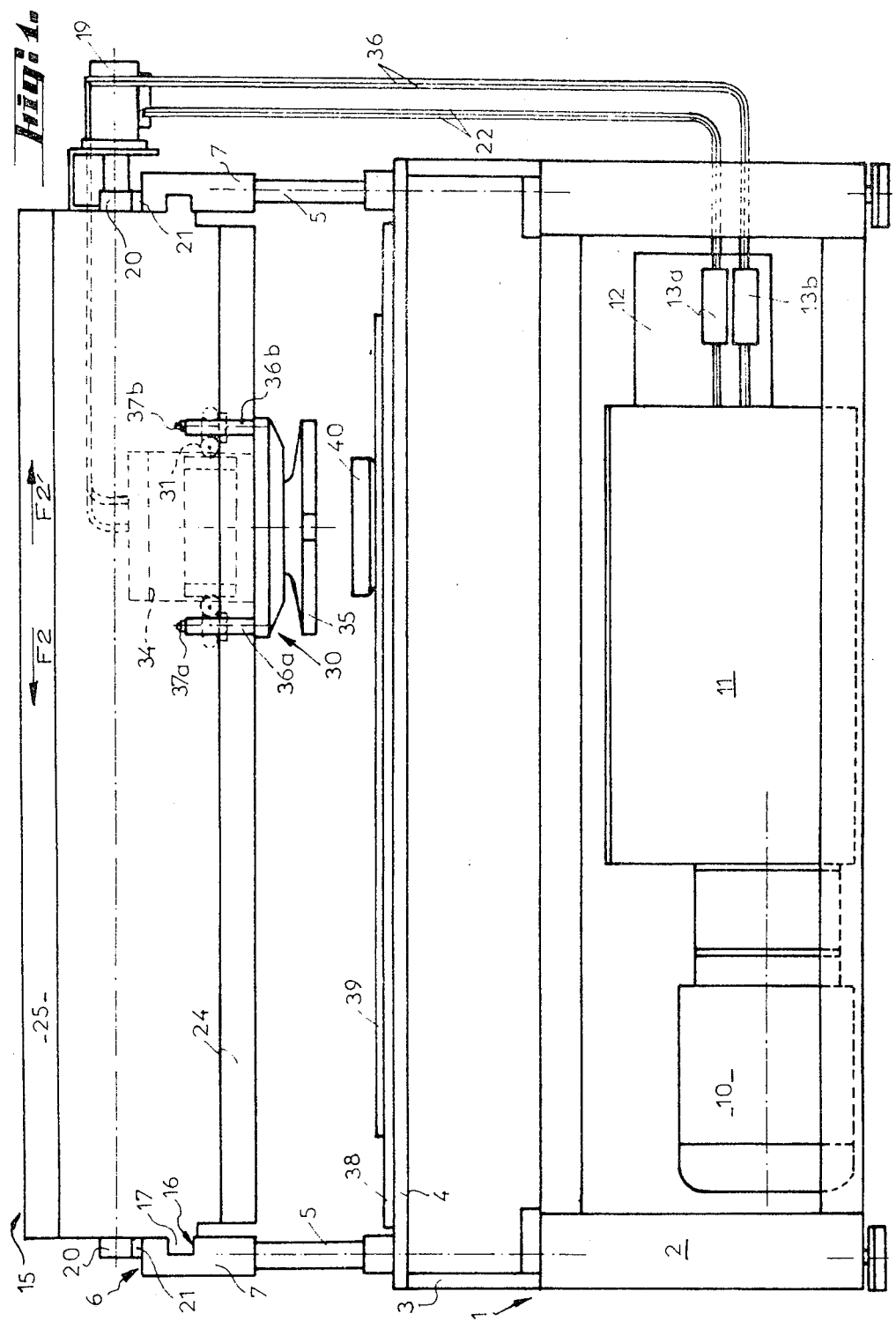

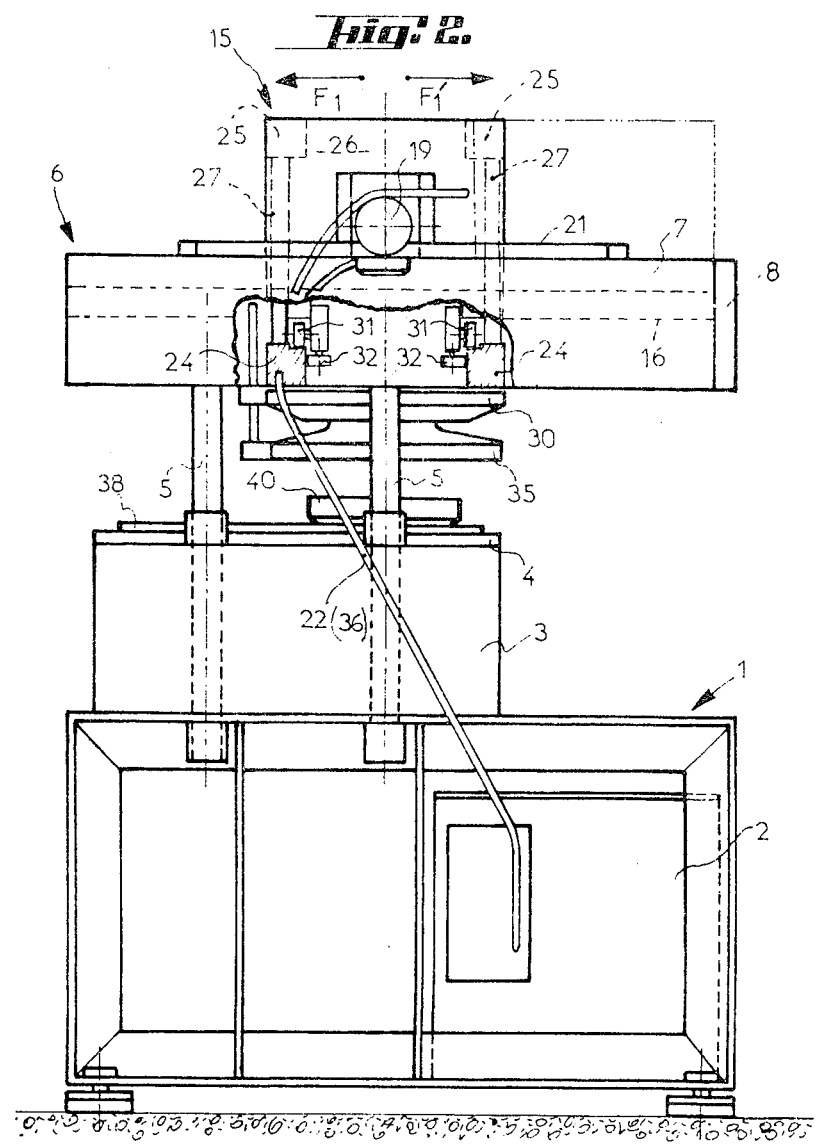

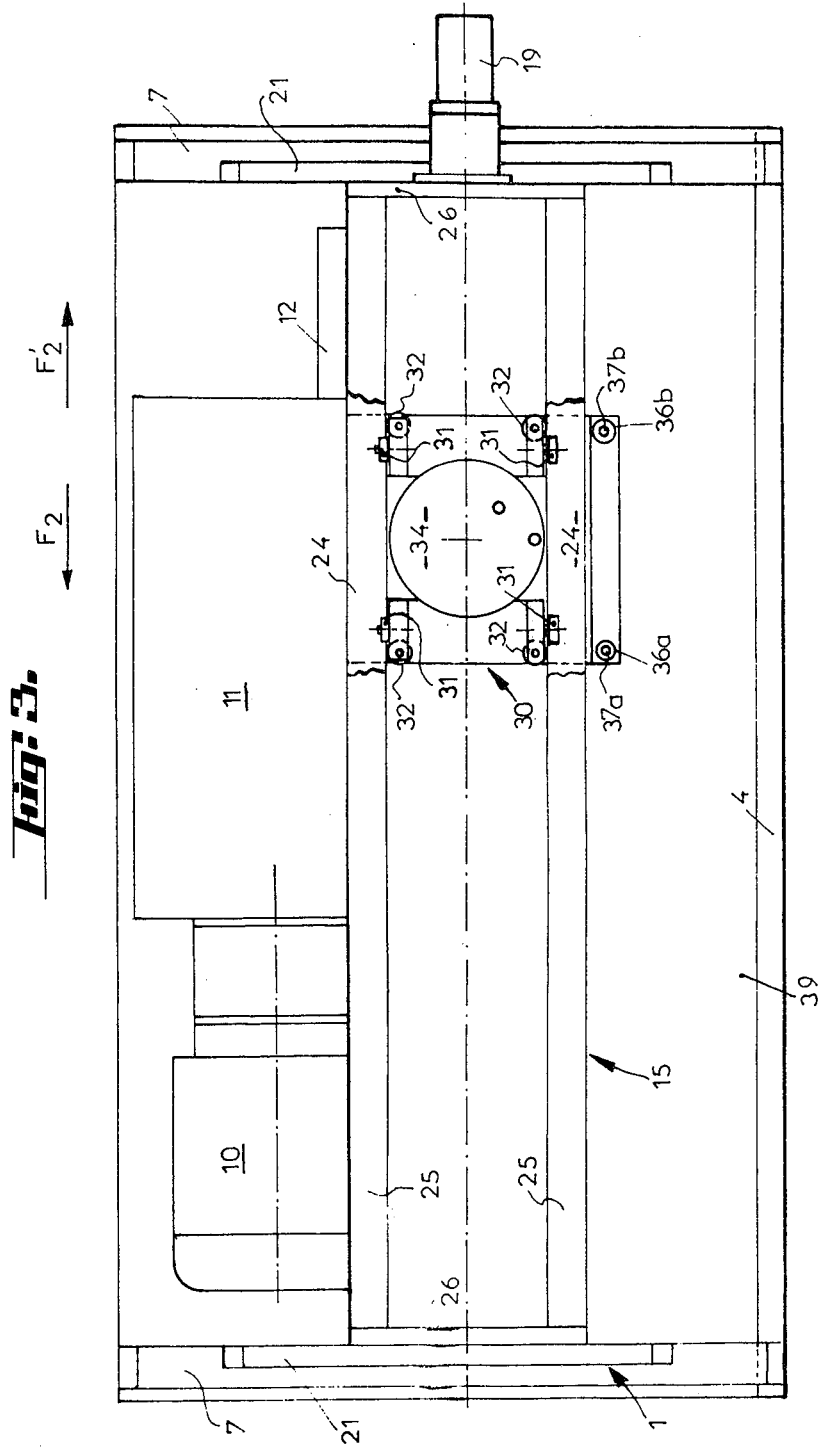

PRESS PROVIDED WITH A PRESS-PLATE WITH THREE DEGREES OF FREEDOM

The present invention has essentially for its object a cutting or forming machine-tool, such as a press for cutting a material in the form of a sheet or web, of the type comprising a horizontal work-table supported by a base structure and provided to receive the material to be cut as well as the cutting tool placed on the said material and a movable bridge or the like located above the work-table and supported by the base structure through the medium of guide means in which it is capable of sliding horizontally so as to either overhang the said table or move aside therefrom.

It is known that in machine-tools of the aforesaid type, particularly in cutting presses, the work-table and the movable bridge or the like have substantially the same dimensions and are capable of relative vertical motion, so that when they are superposed and brought together to a maximum, a pressure is exerted upon the tool to cause the latter to penetrate into and, therefore, cut the said material. Said presses or the like are therefore provided with a movable bridge having very large dimensions in order that the cutting may be carried out at any point of the work-table. Now it often occurs that the cutting is to be performed only locally in the material, by using a single tool or a limited number of tools of small dimensions, which occupies or occupy only a limited region of the work-table and, in this case, the operation of the bridge (or the table) is the same as in the case where a cutting of important dimensions is to be performed, i.e., the whole of, for instance, the bridge is lowered although only a very small portion thereof is used. Now such a bridge, owing to its very dimensions, is slow in displacement and difficult to adjust, thus unduly reducing the cutting rate where only local cutting is desired.

On the other hand, cutting accuracy depends upon strict maintenance of a parallel relationship between the bridge and the work-table, which is the more difficult to maintain during the cutting process, the greater the dimensions of the bridge which applies the pressure and, therefore, is liable to more important deformations.

The machine according to the invention has for its purpose to remove the aforementioned drawbacks and is characterized in that it comprises a press-plate supported by the said bridge and also movable in horizontal translation in a direction perpendicular to the direction of displacement of the bridge itself, the said plate being moreover movable in vertical translation so as to apply to the cutting tool a vertical pressure and cause it to penetrate into the material to be cut.

It is thus seen that the press-plate of the machine according to the present invention, which is supported by a bridge sliding horizontally in a given direction, generally rearwardly or forwardly with respect to the work-table, which itself slides with respect to the bridge in a perpendicular direction, therefore transversely to the work-table, and which, moreover, can be raised or lowered with respect to the table, is therefore capable of motion with three degrees of freedom, thus enabling it to be positioned at any location of the work table where the cutting is to be performed. Such a press-plate may have smaller dimensions than those of the movable bridge of the prior machines and can therefore be operated much more readily and rapidly than the known bridges. Lastly, such a press-plate can be positioned quite accurately above the cutting tool and therefore work with minimum deformation.

According to another feature of the invention, the said press-plate is driven in vertical translation by a hydraulic double-acting actuator mounted on a support which is movable along a guide-way of the bridge.

Such an actuator enables the press-plate to be accurately, smoothly and rapidly operated and an important pressure to be applied.

According to another feature of the invention, the said movable support is provided with running rollers and guide rollers moving along two rails arranged over the whole length of the movable bridge.

Such a mounting of the movable support ensures a more accurate guiding and easier operation by the operator.

According to still another feature of the invention, the said movable bridge and support are provided with drive means enabling them to be displaced in translation with respect to the base structure and to the bridge respectively.

The said means therefore enable the positioning motions of the press-plate to be automated.

Other features and advantages of the invention will appear as the following description proceeds.

In the appended drawings given solely by way of example:

FIG. 1 is an elevational front view of a cutting press according to one form of embodiment of the invention;

FIG. 2 is an elevational side view, partly broken away, of the said press; and

FIG. 3 is a top view, partly broken away, of the said press.

According to the form of embodiment illustrated in the drawings, the press comprises essentially a stationary base structure designated generally by the reference numeral 1 comprising a lower portion 2 which supports, on the one hand, a rigid casing or the like 3 provided at its upper portion with a stationary horizontal work-table 4 substantially rectangular in shape and, on the other hand, through the medium of four vertical columns 5, an upper frame 6 formed of two identical and parallel horizontal longitudinal beams 7 interconnected at their rear ends by a cross-member 8. Within the lower portion 2 of the base structure 1 is located a hydraulic set of a conventional type constituted by a motor-pump set 10, a fluid supply tank 11, a control panel or distributor 12 on which are mounted electromagnetic valves shown diagrammatically at 13a and 13b for feeding the various actuating means of the press.

A movable bridge 15 is so mounted as to slide horizontally on the frame 6 along guideways 16 provided on the internal faces of the longitudinal beams 7 and in which are engaged the counter-guides 17 of the movable bridge 15. The bridge 15 is provided with a motor 19, for instance a hydraulic motor, enabling it to be driven in tranlation on the frame 6 in two opposite directions F1 and F'1 through the medium of pinions 20 meshing with toothed racks 21 integral with the longitudinal beams 7. The motor 19 is connected through two conduits 22 to one of the electromagnetic valves 13a of the panel 12. When the bridge 15 is in the extreme position shown in FIG. 2 in dash-dotted lines, it is completely moved aside from the work-table 4, whereas in other positions such as the one shown in plain lines in FIG. 2, it overhangs at least partially the said work-table.

The bridge 15 is constituted essentially by a horizontal structure formed of two longitudinal beams or the like arranged at the four corners of a rectangle and comprising two lower longitudinal beams 24 forming rolling rails, as will be described hereinafter, and two upper longitudinal beams 25, the said four longitudinal beams being interconnected by end-plates 26 and by front and rear plates or the like 27.

On the bridge 15 is mounted a carriage 30 provided with four running rollers 31 and four guide rollers 32 resting upon the rails 24, so that the said carriage may be displaced over the whole length of the said rails transversely to the work-table 4, i.e., in two opposite directions F2, F'2 perpendicular to the directions F1, F'1 of displacement of the bridge. The carriage 30 supports a double-acting actuator 34 arranged vertically and ensuring the vertical displacement of a press-plate 35 secured to the lower end of its rod (not shown). Conduits 36 connected to the electromagnetic valve 13b are provided to feed the actuator 34 in one direction or the other so as to lower or raise the press-plate 35. The carriage 30 is provided at its front portion with two vertical handles 36a and 36b enabling it to be driven in translation on the rails 24. At the upper end of each handle is mounted a control member constituted by a push-button 37a, 37b inserted in the control circuit of the electromagnetic valves 13a and 13b feeding the motor 19 and the actuator 34 respectively.

The press operates as follows.

While the press-plate 35 is in its upper position, as shown in FIG. 1, and the movable bridge 15 is moved aside from the work-table 4 and occupies the extreme position shown in dash-dotted lines in FIG. 2, the operator places the material 39 to be cut on the said work-table, more precisely on the pad or block 38 covering it, then he places the cutting tool 40 on the said material. Thereafter, the operator takes hold of the handles 36a and 36b. By means of the push-button 37a he first actuates the movable bridge 15 and, at the same time, displaces manually the carriage 30 so as to bring the press-plate 35 above the tool. He then stops the displacement of the bridge and uses the push-button 37b to lower the press-plate 35 so as to apply it on the cutting tool and drive it into the material 39.

It is therefore seen that the press according to the invention enables the operator, without practically any effort, to move the press-plate to any location where he has positioned his tool to perform the cutting. The press therefore ensures great flexibility in use resulting in high cutting rates. Moreover, the way in which the press-plate is operated enables it to be maintained in strict parallel relationship to the work table 4.

A certain number of modifications may be brought to the press just described without departing from the scope of the invention. For example, the carriage 30, instead of being operated manually as in the case described and illustrated, may be provided with a drive motor, for instance a hydraulic motor comparable with the drive motor 19 of the movable bridge.

Of course, the invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. Press for cutting a material in the form of a sheet or web, comprising a base structure, a stationary horizontal work-table fixedly supported by said base structure adapted to receive a material to be cut as well as a cutting tool placed on said material, said work-table having a predetermined length between opposed lateral ends thereof and a predetermined width extending forwardly and rearwardly between front and rear edges of said table, stationary longitudinal beams extending forwardly and rearwardly and arranged horizontally, in parallel relationship to one another, on either side of said work-table and above the latter over said lateral ends of said work-table at a distance from each other substantially equal to the length of said work-table, said longitudinal beams having front ends respectively situated substantially over said front edge of said work-table and extending from said front ends rearwardly beyond the rear edge of said table where said beams terminate in rear ends situated at an elevation higher than said table at a substantial distance to the rear thereof, a moving bridge extending substantially over the whole length of said work-table and having front and rear edges parallel to the front and rear edges of said work-table and situated from each other by a given distance, said beams extending rearwardly beyond said rear edge of said work-table by a distance which is at least substantially as great as the distance between said front and rear edges of said bridge, said bridge being supported at its ends by said longitudinal beams by means of a system of guide-ways and counter-guides so that said bridge is capable of sliding horizontally along said beams across said table forwardly and rearwardly so as to either overhang said table to a predetermined extent or be situated substantially entirely to the rear of said table to provide unobstructed access thereto, a carriage mounted on said bridge at a lower portion thereof and movable in horizontal translation along said bridge toward one or the other of said beams in a direction perpendicular to the directions of displacement of the bridge itself so as to have two degrees of freedom over the work-table in a horizontal plane, namely freedom of movement forwardly and rearwardly and freedom of movement in opposed lateral directions, a press-plate supported by said carriage, said press-plate being movable in vertical translation with respect to said carriage so as to apply a vertical pressure on the cutting tool and cause it to penetrate into the material to be cut, when said press-plate is situated over the cutting tool, said press-plate having from front to rear a dimension substantially smaller than the distance between the front and rear edges of the table and from side to side a dimension substantially smaller than the length of said table, and said beams cooperating with said bridge for situating said press-plate in the region of the front and rear edges of said work-table or at any location between the latter front and rear edges while said carriage cooperates with said bridge for situating said press-plate at the region of the lateral ends of said work-table or at any location between said lateral ends.

2. Press according to claim 1, wherein said press-plate is driven in vertical translation by a hydraulic double-acting actuator having an actuator feed circuit and mounted on said carriage.

3. Press according to claim 1, wherein said carriage is provided with running rollers and guide rollers moving along two rails arranged at the lower portion of said bridge over the whole length of the latter.

4. Press according to claim 2, wherein said bridge and carriage are provided with drive means by which they are displaced in translation with respect to said base structure and to said bridge respectively.

5. Press according to claim 4, wherein said bridge drive means comprise a hydraulic motor having a motor feed circuit, said hydraulic motor driving said bridge by means of a system of pinions and toothed racks, whereas said carriage is provided with handles enabling it to be driven manually.

6. Press according to claim 5, wherein said carriage is provided with a first handle comprising a motor feed control member and with a second handle comprising an actuator feed control member.

7. Press according to claim 6, wherein said control members are constituted by push-buttons connected to electromagnetic valves inserted in said motor and actuator feed circuits.

* * * * *